United States Patent
Elie et al.

(10) Patent No.: US 9,809,218 B2
(45) Date of Patent: *Nov. 7, 2017

(54) SYSTEM AND METHOD FOR AUTONOMOUS VALET PARKING USING PLENOPTIC CAMERAS

(71) Applicant: Ford Global Technologies, LLC, Dearborn, MI (US)

(72) Inventors: Larry Dean Elie, Ypsilanti, MI (US); Douglas Scott Rhode, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,577

(22) Filed: Jan. 27, 2017

(65) Prior Publication Data

US 2017/0137024 A1    May 18, 2017

Related U.S. Application Data

(63) Continuation of application No. 14/834,203, filed on Aug. 24, 2015, now Pat. No. 9,557,741.

(51) Int. Cl.
*G05D 1/02* (2006.01)
*G05D 1/00* (2006.01)
(Continued)

(52) U.S. Cl.
CPC ......... B60W 30/06 (2013.01); B62D 15/0285 (2013.01); G01B 11/22 (2013.01); G01S 19/13 (2013.01); G05D 1/0088 (2013.01); G05D 1/0246 (2013.01); G05D 1/0251 (2013.01); G05D 1/0274 (2013.01); G06F 17/30259 (2013.01); G06K 9/00812 (2013.01); (Continued)

(58) Field of Classification Search
None
See application file for complete search history.

(56) References Cited

U.S. PATENT DOCUMENTS 7,737,866 B2    6/2010    Wu et al.
8,587,681 B2    11/2013   Guidash
(Continued)

FOREIGN PATENT DOCUMENTS

DE    102013213064 A1    1/2015

OTHER PUBLICATIONS

Alberto Broggi and Elena Cardarelli, *Vehicle Detection for Autonomous Parking Using a Soft-Cascade ADA Boost Classifier*, Jun. 8, 2014, pp. 912-917.

Primary Examiner — Russell Frejd
(74) Attorney, Agent, or Firm — James P. Muraff; Neal, Gerber & Eisenberg LLP

(57) ABSTRACT

Exemplary embodiments provide systems and methods for autonomously valet parking a vehicle based on images obtained from a plurality of plenoptic (light field) cameras. An example vehicle includes a plenoptic camera to obtain an image external to the vehicle and a controller. The controller is to autonomously navigate a vehicle toward a parking space identified as unoccupied and generate, based on the image, an occupancy map indicating occupied regions in a plurality of concentric regions. The controller also is to determine whether the parking space is available based on the occupancy map and send, in response to determining the parking space is unavailable, an error message to a driver.

20 Claims, 10 Drawing Sheets

(51) Int. Cl.

| | | |
|---|---|---|
| *G06F 17/30* | (2006.01) | |
| *G06T 7/73* | (2017.01) | |
| *G01B 11/22* | (2006.01) | |
| *G08G 1/14* | (2006.01) | |
| *B60W 30/06* | (2006.01) | |
| *B62D 15/02* | (2006.01) | |
| *G01S 19/13* | (2010.01) | |
| *G06K 9/00* | (2006.01) | |

(52) U.S. Cl.
CPC ............... *G06T 7/73* (2017.01); *G08G 1/141* (2013.01); *G08G 1/143* (2013.01); *G08G 1/144* (2013.01); *G05D 2201/0212* (2013.01); *G06T 2207/10052* (2013.01)

(56) References Cited

U.S. PATENT DOCUMENTS

| 8,780,257 | B2 | 7/2014 | Gidon |
|---|---|---|---|
| 2007/0230944 | A1 | 10/2007 | Georgiev |
| 2010/0156672 | A1 | 6/2010 | Yoo et al. |
| 2012/0323643 | A1 | 12/2012 | Volz |
| 2013/0113936 | A1 | 5/2013 | Cohen |
| 2013/0231824 | A1 | 9/2013 | Wilson et al. |
| 2013/0314502 | A1 | 11/2013 | Urbach |
| 2014/0147032 | A1 | 5/2014 | Yous |
| 2014/0327736 | A1 | 11/2014 | Dejohn |
| 2015/0077522 | A1 | 3/2015 | Suzuki |
| 2015/0091741 | A1 | 4/2015 | Stefik |
| 2015/0286340 | A1 | 10/2015 | Send |
| 2016/0127664 | A1 | 5/2016 | Bruder |

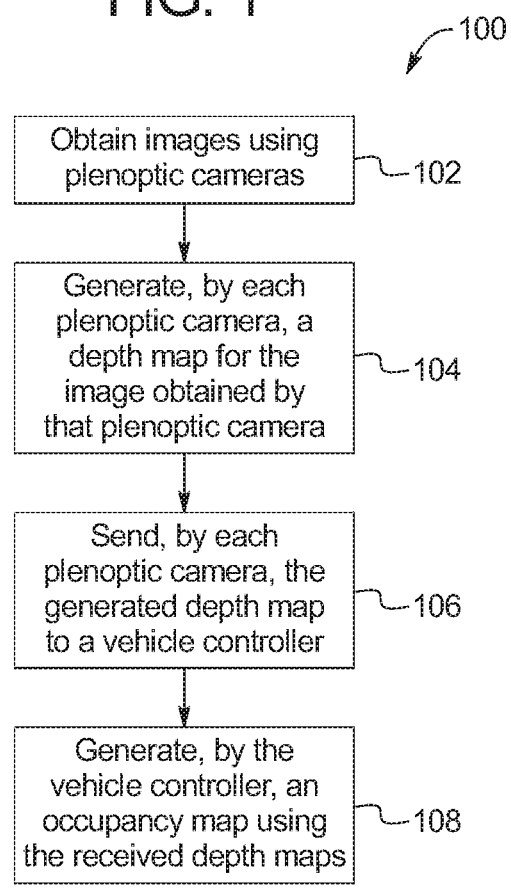

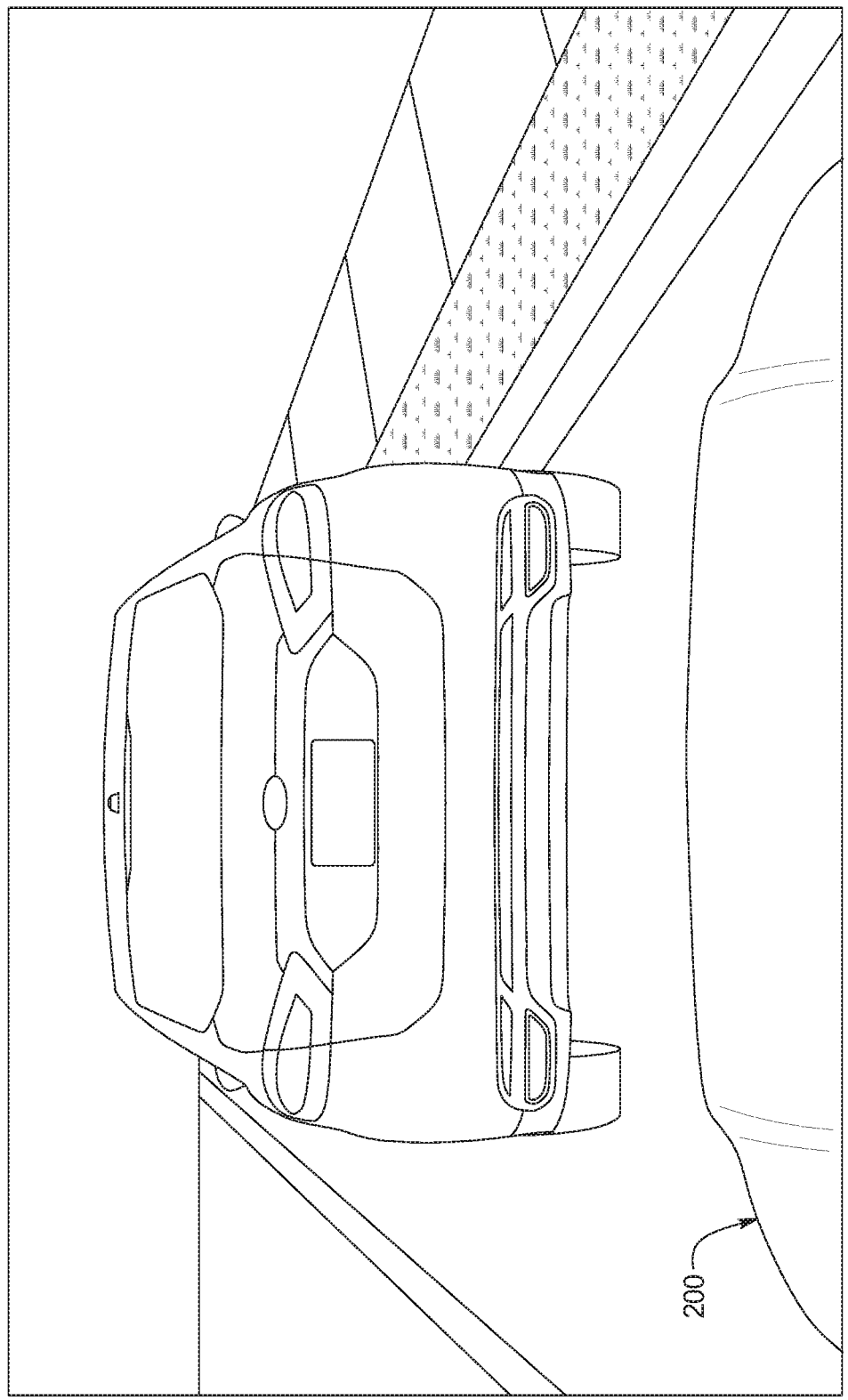

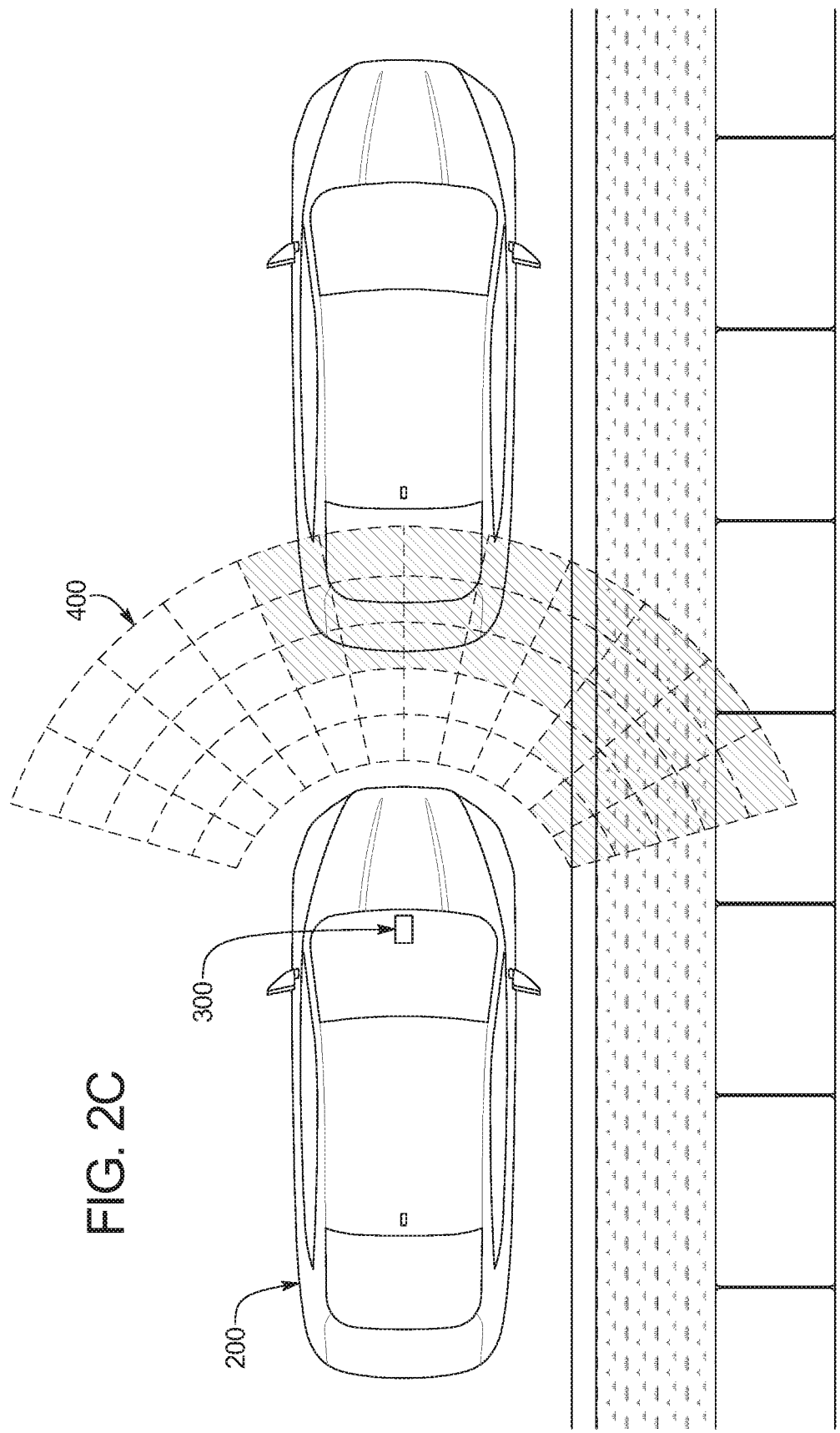

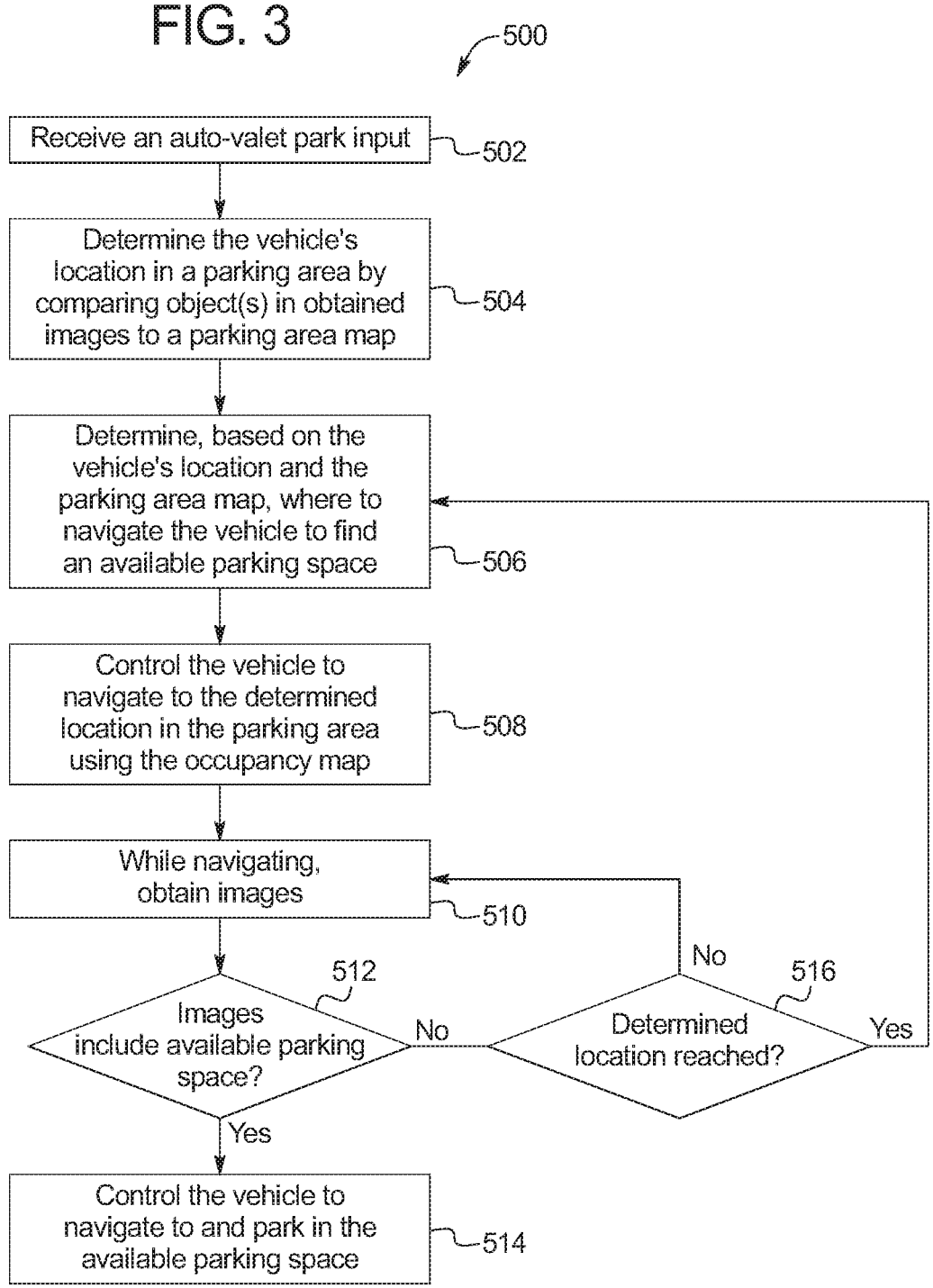

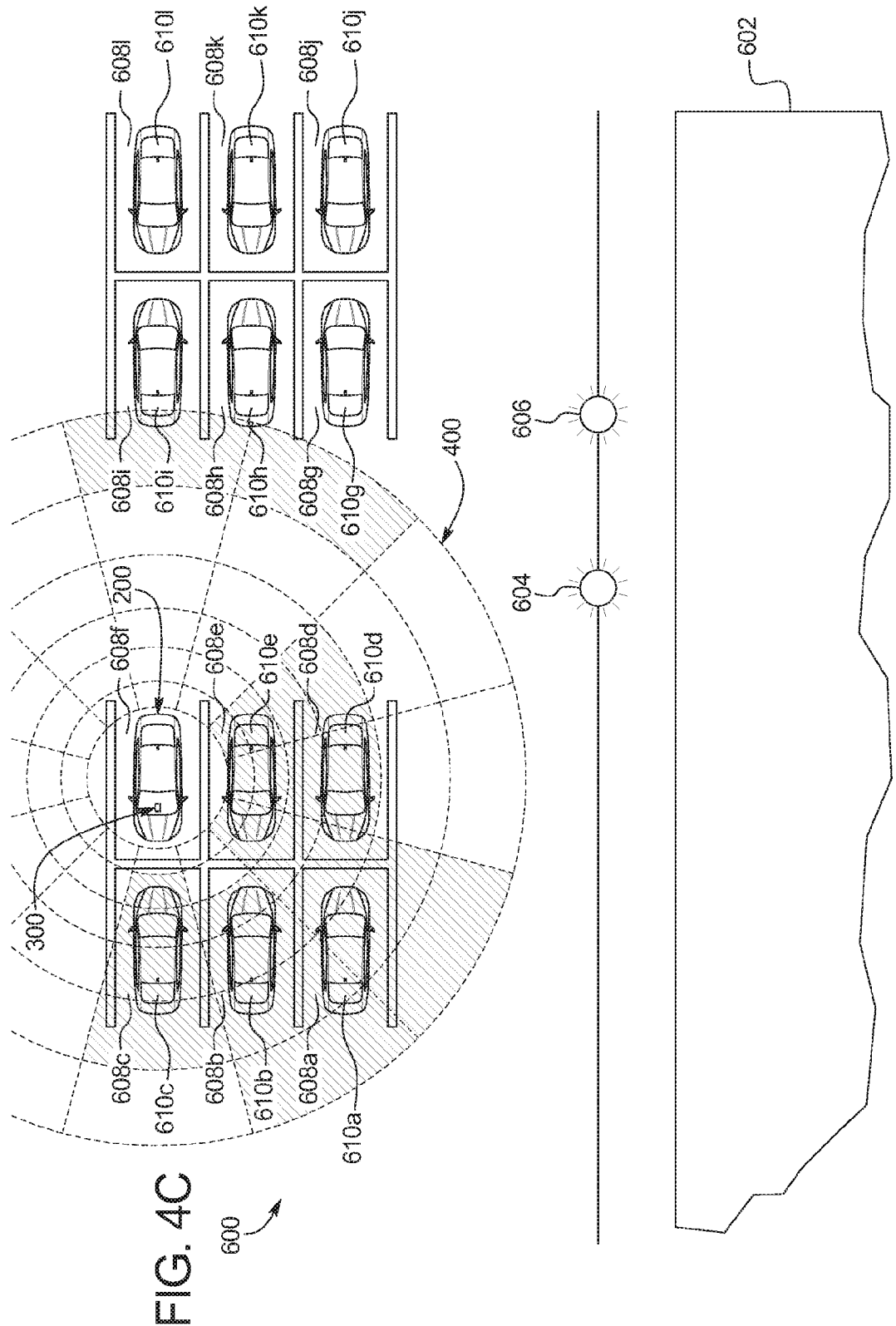

SYSTEM AND METHOD FOR AUTONOMOUS VALET PARKING USING PLENOPTIC CAMERAS

CROSS-REFERENCE TO RELATED APPLICATIONS

This application is a continuation of U.S. patent application Ser. No. 14/834,203, filed on Aug. 24, 2015 and granted as U.S. Pat. No. 9,557,741, which is incorporated herein by reference in its entirety.

TECHNICAL FIELD

The present disclosure generally relates to a system and method for autonomous valet parking using plenoptic (light field) cameras. More particularly, the autonomous valet parking system of the present disclosure is configured to use plenoptic cameras to obtain images external to a vehicle and, using those images, identify an available parking space and autonomously control the vehicle to navigate to and park in the available parking space.

BACKGROUND

Vehicles that can autonomously park are becoming more commonplace. The sensors these known vehicles employ to enable autonomous parking, such as ultrasonic sensors, RADAR, and/or LIDAR, have advantages and disadvantages. Ultrasonic sensors are inexpensive, but they are relatively inaccurate. For instance, ultrasonic sensors have difficulty detecting certain objects, such as curb shapes and even other vehicles, when the geometry and/or the material of the objects do not provide a strong return. Further, ultrasonic sensors do not output precise directional information because the ultrasonic sensor beam pattern is wide. LIDAR provides relatively good object range and heading information, but is expensive. RADAR provides relatively good object range rate information, but has difficulty detecting some objects and is expensive. There is a need for new sensing systems and methods for autonomously parking vehicles.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide systems and methods for autonomously valet parking a vehicle based on images obtained from a plurality of plenoptic (light field) cameras.

According to one embodiment, an autonomous valet parking system comprises a plenoptic camera configured to: obtain an image external to a vehicle, and for the image, generate a depth map including location information for an object in the image; and a controller configured to: using the depth map, generate an occupancy map indicating whether each of a plurality of regions surrounding the vehicle is occupied; and using the occupancy map, control the vehicle to navigate to a desired parking space.

According to another embodiment, an autonomous valet parking method comprises obtaining, by a plenoptic camera, an image external to a vehicle; generating, by the plenoptic camera, a depth map including location information for an object in the image; using the depth map, generating, by a controller, an occupancy map indicating whether each of a plurality of regions surrounding the vehicle is occupied; and using the occupancy map, controlling, by the controller, the vehicle to navigate to a desired parking space.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

FIG. 1 is a flowchart of an example process or method 100 for generating depth maps and an occupancy map using the autonomous valet parking system of the present disclosure.

FIGS. 2A, 2B, and 2C illustrate a vehicle including the autonomous valet parking system of the present disclosure and using the plenoptic camera to generate a depth map and the vehicle controller to generate an occupancy map using the process of FIG. 1.

FIG. 3 is a flowchart of an example process or method for autonomously valet parking a vehicle using an occupancy map and a stored parking area map using the autonomous valet parking system of the present disclosure.

FIGS. 4A, 4B, and 4C illustrate a vehicle including the autonomous valet parking system of the present disclosure and using the autonomous valet parking system to autonomously valet park the vehicle in a parking area using the process of FIG. 3.

DETAILED DESCRIPTION OF EXAMPLE EMBODIMENTS

Autonomous Valet Parking Using Plenoptic Cameras

Figure 2A:
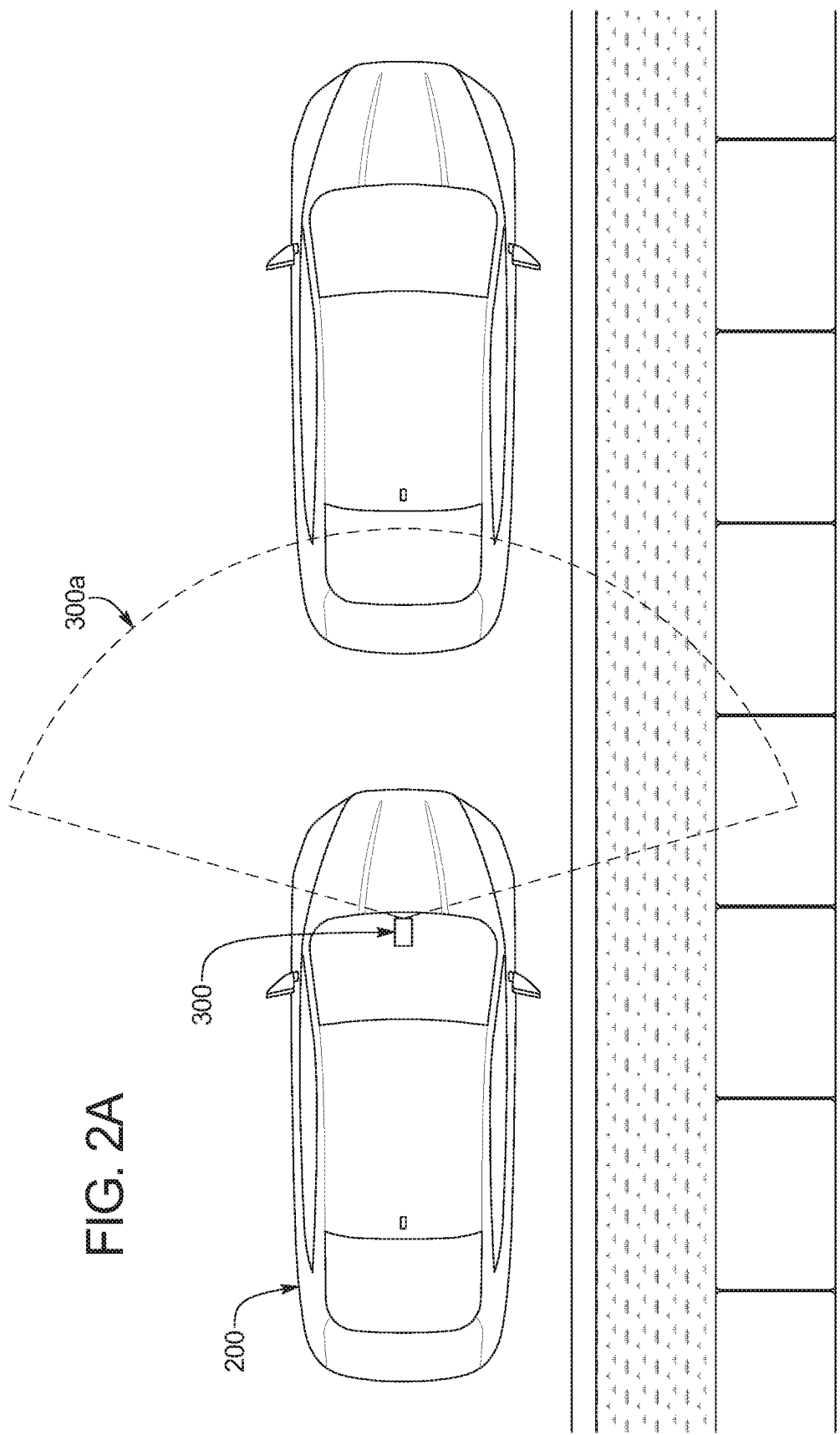

While the system and method of the present disclosure may be embodied in various forms, there are shown in the drawings, and will hereinafter be described, some exemplary and non-limiting embodiments of the system and method. The present disclosure is to be considered an exemplification of the system and method and is not intended to limit the system and method to the specific embodiments illustrated and described herein. Not all of the depicted components described in this disclosure may be required, however, and some embodiments may include additional, different, or fewer components from those expressly described herein. Variations in the arrangement and type of the components may be made without departing from the spirit or scope of the claims set forth herein.

Various embodiments of the present disclosure provide a system and method for autonomous valet parking using plenoptic cameras. Generally, the autonomous valet parking system is configured to use plenoptic cameras to obtain images external to a vehicle and, using those images, identify an available parking space and autonomously control the vehicle to navigate to and park in the available parking space. More specifically, the autonomous valet parking system is configured to use a plurality of plenoptic cameras to obtain images external to the vehicle and to generate depth maps for the obtained images. The depth maps include location information for one or more objects in the images. After generating the depth maps, the plenoptic cameras send the depth maps to a vehicle controller. The depth maps enable the vehicle controller to determine the distance between the exterior surfaces of the vehicle and objects surrounding the vehicle, such as curbs, pedestrians, other vehicles, and the like. The vehicle controller uses the received depth maps to generate an occupancy map by dividing the area surrounding the vehicle into a plurality of distinct regions and, based on the location information in the depth map, classifying each region as either occupied (e.g., by all or part of an object) or unoccupied. The vehicle controller then identifies a desired parking space in one of a variety of different manners and, using the occupancy map, controls the vehicle to navigate to and park in the desired parking space by traveling through unoccupied regions in the occupancy map.

The components of the autonomous valet parking system of the present disclosure (described in detail below) may be included on, within, or otherwise integrated with a vehicle. One or more of the components of the autonomous valet parking system may be shared with one or more components of existing vehicle systems, such as (but not limited to) the navigation system.

The autonomous valet parking system may be included in or otherwise usable with any suitable vehicle, such as (but not limited to): (1) a non-commercial passenger vehicle such as a sedan or a truck; (2) a commercial vehicle such as a tractor-trailer; or (3) a non-civilian vehicle such as a vehicle used by a law enforcement agency, a government agency, an emergency response agency (e.g., a fire response agency), or a medical response agency (e.g., a hospital). This list is not exhaustive, and is provided for exemplary purposes only.

Although the vehicle and the features corresponding to the autonomous valet parking system described herein are described below in situations in which the vehicle is moving, it is also within the scope of this disclosure that the same features may apply when the vehicle is in a stationary state (e.g., parked, stopped at a red light, or stopped in traffic).

1. Generating Depth Maps and an Occupancy Map

In various embodiments, before the autonomous valet parking system can autonomously valet park a vehicle, the autonomous valet parking system generates an occupancy map that provides information about the regions in which the vehicle may safely travel.

FIG. 1 is a flowchart of an example process or method 100 for generating depth maps and an occupancy map using the autonomous valet parking system of the present disclosure. In various embodiments, the process 100 is represented by a set of instructions stored in one or more memories and executed by one or more processors (such as those described below in connection with FIG. 7). Although the process 100 is described with reference to the flowchart shown in FIG. 1, many other processes of performing the acts associated with this illustrated process 100 may be employed. For example, the order of certain of the illustrated blocks may be changed, certain of the illustrated blocks may be optional, and/or certain of the illustrated blocks may not be employed.

In operation of this embodiment, the autonomous valet parking system obtains images using one or more and preferably a plurality of plenoptic cameras, as indicated by block 102. For example, a front-facing plenoptic camera of the vehicle obtains an image external to the front of the vehicle, a right-side-facing plenoptic camera of the vehicle obtains an image external to the right side of the vehicle, a rear-facing plenoptic camera of the vehicle obtains an image external to the rear of the vehicle, and a left-side-facing plenoptic camera of the vehicle obtains an image external to the left side of the vehicle. In this example embodiment, the plenoptic cameras combine to provide a 360 degree view of the area surrounding the vehicle. Each plenoptic camera generates a depth map for the image it obtained, as indicated by block 104. The depth map for an image includes location information indicating the distance of surfaces of the object(s) in the image from a reference point fixed to the vehicle, such as the location of the plenoptic camera that obtained that image or any other suitable point, or fixed in a vehicle coordinate system. The plenoptic cameras then send the generated depth maps (including the location information) to the vehicle controller, as indicated by block 106.

The vehicle controller generates an occupancy map using the depth maps received from the plenoptic cameras, and particularly using the location information in those depth maps, as indicated by block 108. Specifically, the vehicle controller first transforms or combines the depth maps to a common vehicle coordinate system and then generates the occupancy map by, using the vehicle coordinate system, dividing the area surrounding the vehicle into a plurality of distinct regions and, based on the location information in the depth maps, classifies each region as either occupied (i.e., all or part of an object is located in the region) or unoccupied (i.e., no objects are located in the region). Specifically, since the vehicle controller knows the location of the regions relative to the vehicle (using the vehicle coordinate system) and, based on the location information of the depth map, the locations of objects surrounding the vehicle, the vehicle controller is able to determine, for each region, if all or part of an object is located within that region. If a region in the occupancy map is unoccupied, that region is a travel region in which the vehicle can safely travel, and if an region in the occupancy map is occupied, that region is not a travel region and the vehicle cannot safely travel in that region. In this embodiment, as long as the vehicle is powered on, the process 100 continuously repeats such that the vehicle controller updates the occupancy map in real-time.

FIGS. 2A, 2B, and 2C illustrate a vehicle including the autonomous valet parking system of the present disclosure and using the plenoptic camera to generate a depth map and the vehicle controller to generate an occupancy map using the process 100. For brevity and clarity, this example embodiment includes a single plenoptic camera, though the below description can be adapted to apply to multiple plenoptic cameras. FIG. 2A shows a vehicle 200 that includes a front-facing plenoptic camera 300 having a field-of-view 300a. The autonomous valet parking system uses the plenoptic camera 300 to obtain the image shown in FIG. 2B. The plenoptic camera 300 then generates a depth map (not shown) for the image shown in FIG. 2B. The depth map includes location information that indicates the distance of each surface in the image—such as various points on the exterior surface of the vehicle in front of the vehicle 300, various points on the curb, various points on the grass, various points on the sidewalk, various points on the road, and the like—to the plenoptic camera 300. The plenoptic camera 300 then sends the depth map to a vehicle controller of the autonomous valet parking system.

As shown in FIG. 2C, the vehicle controller generates an occupancy map 400 using the depth map and, more particularly, the location information in the depth map. Specifically, the vehicle controller divides the area surrounding the vehicle 300 into a plurality of regions and uses the location information in the depth map to determine whether each region is occupied by an object (as described above). In FIG. 2C, shaded regions of the occupancy map are occupied (and are therefore not travel regions) and unshaded regions are unoccupied (and are therefore travel regions).

Although the occupancy map is illustrated as being two-dimensional in FIG. 2C, in other embodiments the occupancy map is three dimensional (e.g., each region has a nonzero length, width, and height). The occupancy map may include any suitable quantity of regions having any suitable shape and any suitable size based on various factors such as accuracy, computation power, memory, and the desired function(s) for which the vehicle controller intends to use the occupancy map. For instance, in one embodiment, the regions are about 10 centimeters square.

2. Autonomously Valet Parking a Vehicle in a Parking Area Using the Occupancy Map and a Map of the Parking Area In various embodiments, the autonomous valet parking system is configured to autonomously valet park a vehicle in a parking area using a map of the parking area in conjunction with the occupancy map.

FIG. 3 is a flowchart of an example process or method 500 for autonomously valet parking a vehicle using an occupancy map and a stored parking area map using the autonomous valet parking system of the present disclosure. In various embodiments, the process 500 is represented by a set of instructions stored in one or more memories and executed by one or more processors (such as those described below in connection with FIG. 7). Although the process 500 is described with reference to the flowchart shown in FIG. 3, many other processes of performing the acts associated with this illustrated process 500 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the autonomous valet parking system receives an auto-valet park input, as indicated by block 502. The autonomous valet parking system may receive the auto-valet park system in any suitable manner, such as via an input to a touch screen of the vehicle. To enable the vehicle controller to use the parking area map to navigate to and park in an available parking space in this embodiment, the vehicle controller first determines the vehicle's location. Here, the vehicle controller does so by comparing images obtained by the plenoptic cameras to the parking area map, as indicated by block 504. More specifically, in this embodiment, the plenoptic cameras continuously obtain images, generate depth maps for the images, and send those images and the corresponding depth maps to the vehicle controller. The vehicle controller analyzes the images to identify any objects included in the images, such as curbs, signs, pedestrians, other vehicles, trees, streetlights, houses, and the like. To determine the vehicle's location, the autonomous valet parking system compares any identified objects to the objects included in the parking area map (which the autonomous valet parking system stores in a memory in this example embodiment), and then uses a triangulation technique to determine the vehicle's location.

The autonomous valet parking system determines, based on the vehicle's location and the stored parking area map, where to navigate the vehicle to find an available parking space, as indicated by block 506. The autonomous valet parking system controls the vehicle to navigate to the determined location in the parking area using the occupancy map, as indicated by block 508. Specifically, the vehicle controller controls the vehicle to travel in unoccupied travel regions and not in occupied regions. While the autonomous valet parking system is navigating the vehicle to the determined location, the autonomous valet parking system continuously obtains images using the plenoptic cameras, as indicated by block 510. The vehicle controller analyzes the obtained images to determine if they include an available parking space, as indicated by diamond 512. For instance, the vehicle controller analyzes the obtained images to identify designated objects, such as particular configurations of paint on pavement, that indicate an available parking space. If the image includes an available parking space, the autonomous valet parking system controls the vehicle to navigate to and park in the available parking space, as indicated by block 514. If the image does not include an available parking space, the vehicle controller determines whether the vehicle has reached the designated location, as indicated by diamond 516. If the vehicle has not reached the designated location, the process 500 returns to the block 510. If, on the other hand, the vehicle controller determines at diamond 516 that the vehicle has reached the designated location, the process 500 returns to block 506.

Figure 4A:
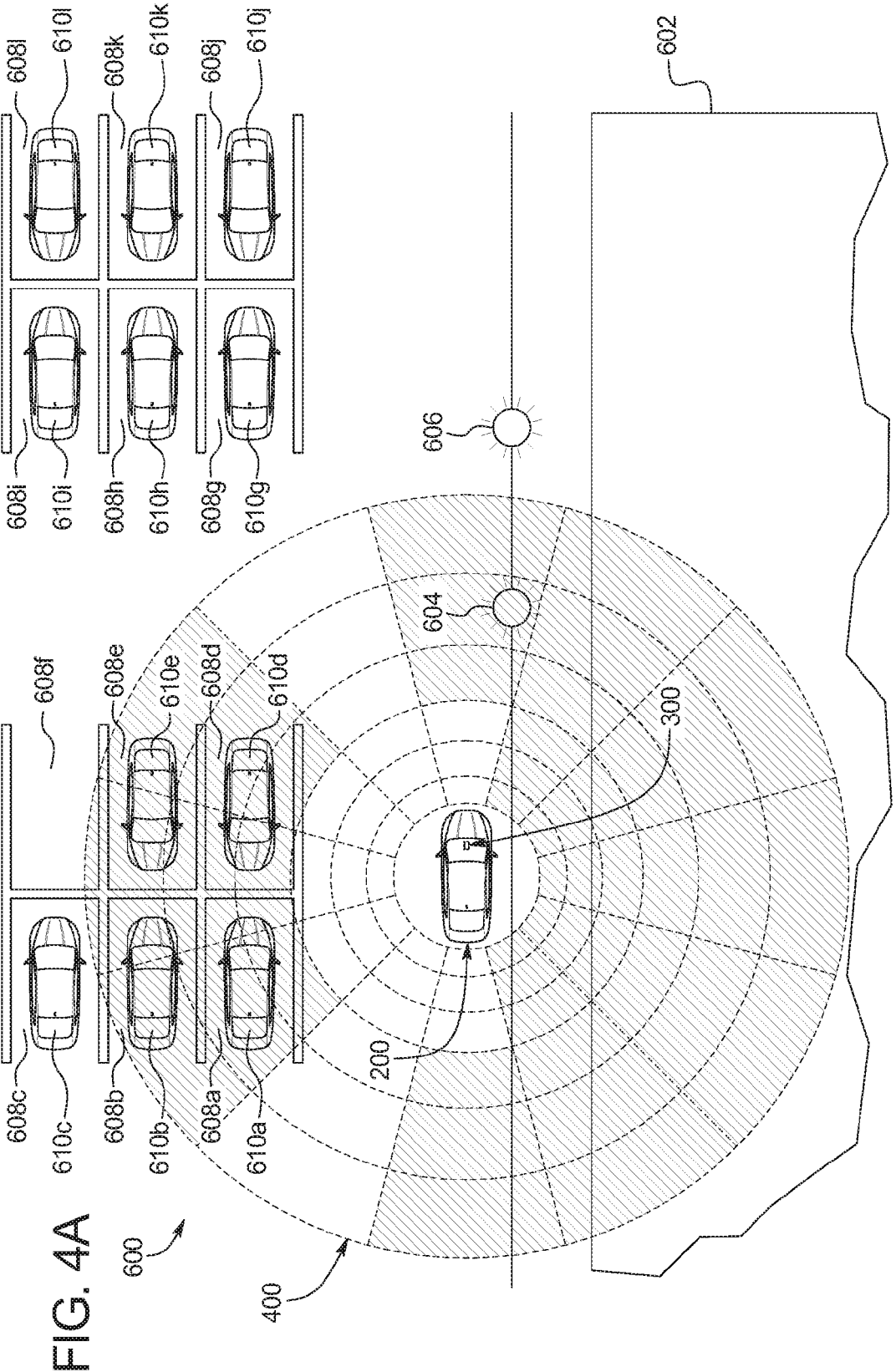
Figure 4B:
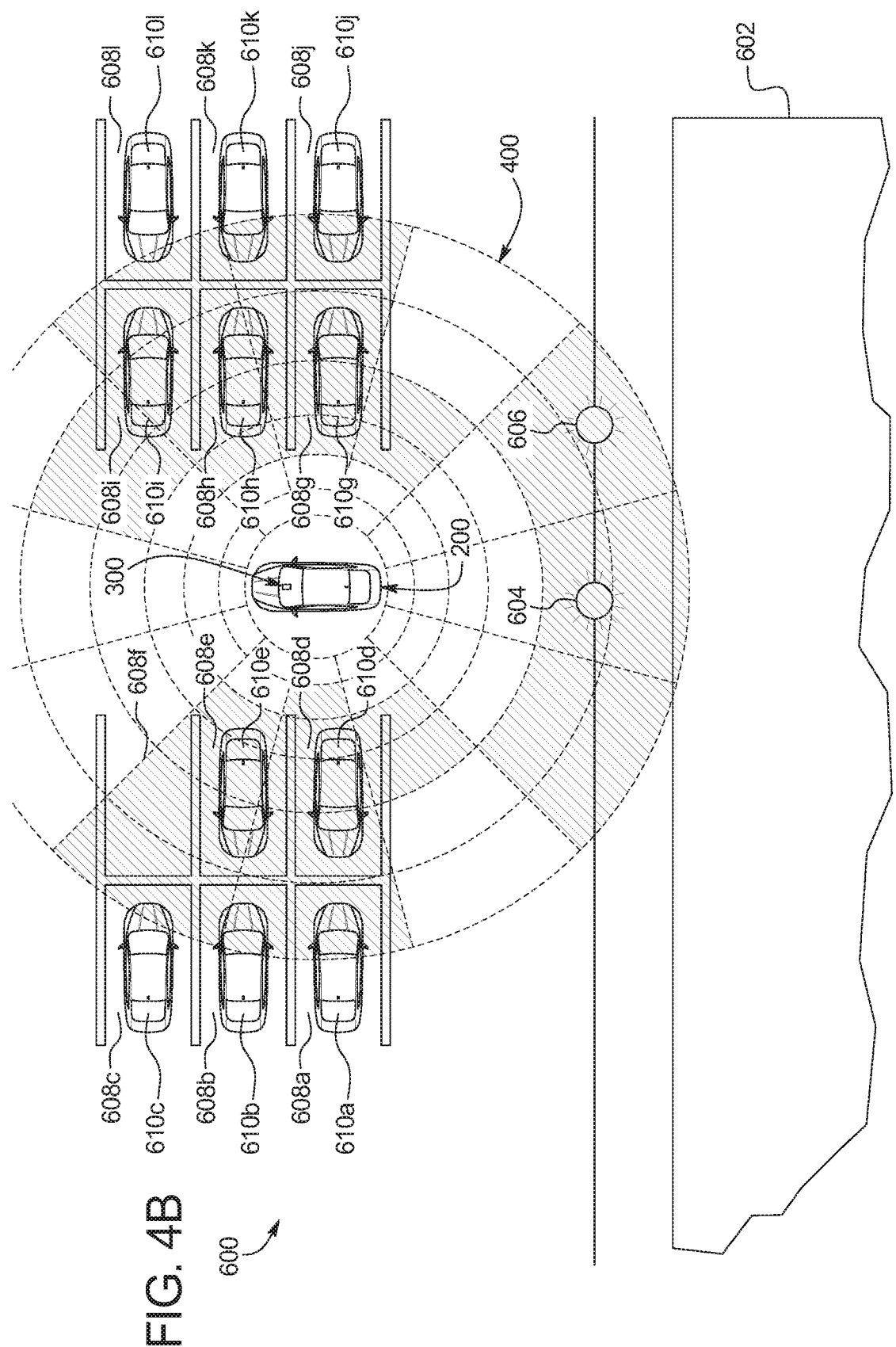

FIGS. 4A, 4B, and 4C illustrate a vehicle including the autonomous valet parking system of the present disclosure and using the autonomous valet parking system to autonomously valet park the vehicle in a parking area using the process 500. FIG. 4A shows the vehicle 200 including the front-facing plenoptic camera 300. Here, the autonomous valet parking system of the vehicle 200 has already generated an occupancy map 400 and has received an auto-valet park input from the driver. The autonomous valet parking system analyzes the images obtained from the plenoptic camera 300 and identifies building 602, streetlights 604 and 606, and parking spaces 608a to 608j. The autonomous valet parking system compares these identified objects to the objects included in the parking area map and determines the vehicle's location.

The autonomous valet parking system determines, based on the vehicle's location and the stored parking area map, to take a left-hand turn and begin looking for available parking spaces. FIG. 4B shows the vehicle 200 after taking the left hand turn. While the autonomous valet parking system is navigating the vehicle, the plenoptic camera 300 continuously obtains and sends images to the vehicle controller, which continuously analyzes those images to attempt to identify an available parking space. Here, the vehicle controller identifies available parking space 608f and, as shown in FIG. 4C, controls the vehicle 200 to park in the parking space 608f.

In certain embodiments, the autonomous valet parking system stores the map of the parking area in a memory (described below). In other embodiments, the autonomous valet parking system may access and/or download the parking area map from a remote location, such as a server, via a wireless (or wired) connection.

3. Autonomously Valet Parking a Vehicle in a Parking Area Using the Occupancy Map and without Relying on the Vehicle's Location In various embodiments, the autonomous valet parking system is configured to autonomously valet park a vehicle in a parking area using the occupancy map and without relying on the vehicle's location.

Figure 5:
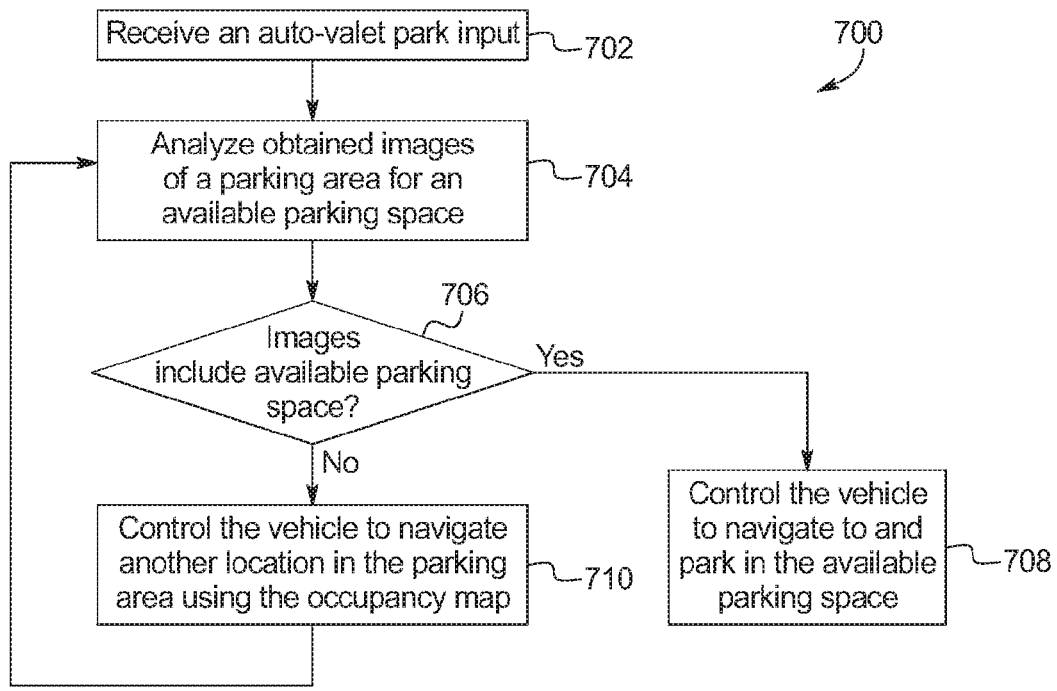
FIG. 5 is a flowchart of an example process or method for autonomously valet parking a vehicle using an occupancy map and not using the vehicle's location using the autonomous valet parking system of the present disclosure.

FIG. 5 is a flowchart of an example process or method 700 for autonomously valet parking a vehicle using an occupancy map using the autonomous valet parking system of the present disclosure. In various embodiments, the process 700 is represented by a set of instructions stored in one or more memories and executed by one or more processors (such as those described below in connection with FIG. 7). Although the process 700 is described with reference to the flowchart shown in FIG. 5, many other processes of performing the acts associated with this illustrated process 700 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the autonomous valet parking system receives an auto-valet park input, as indicated by block 702. In this embodiment, the plenoptic cameras continuously obtain images and send those images to the vehicle controller. The vehicle controller analyzes these obtained images to identify any objects included in the images, such as curbs, signs, pedestrians, other vehicles, trees, streetlights, houses, paint on the pavement, and the like. The vehicle controller analyzes the obtained images to attempt to identify an available parking space, as indicated by block 704, and determines whether a parking space is available, as indicated by diamond 706. If a parking space is not available, the vehicle controller controls the vehicle to navigate to another location in the parking area using the occupancy map, as indicated by block 710, and the process 700 returns to block 704. On the other hand, if the vehicle controller determines at diamond 706 that a parking space is available, the vehicle controller controls the vehicle to navigate to and park in the available parking space, as indicated by block 708.

For instance, in one embodiment, a parking area (such as a parking lot, parking garage, or other structure) includes a plurality of markers that the vehicle controller can recognize and use to direct the vehicle to a parking space or a collection of a plurality of parking spaces (e.g., a particular floor of a parking garage). For example, the parking area may include stickers, paint, or particular structures that the vehicle controller can identify and that provide a "bread crumb trail" for the vehicle to follow to parking spaces.

4. Autonomously Valet Parking a Vehicle in a Designated Parking Space

In various embodiments, the autonomous valet parking system is configured to autonomously valet park a vehicle in a designated parking space, such as an assigned parking space in an apartment complex's parking garage or at the driver's employer's parking lot.

Figure 6:
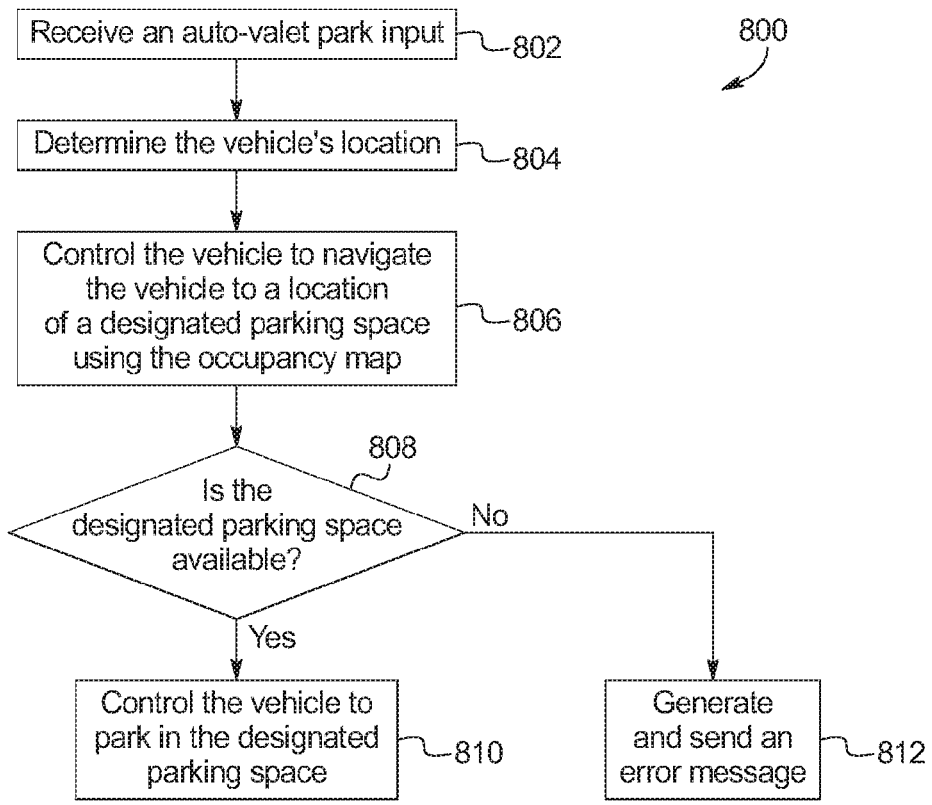
FIG. 6 is a flowchart of an example process or method for autonomously valet parking a vehicle in a designated parking space using the autonomous valet parking system of the present disclosure.

FIG. 6 is a flowchart of an example process or method 800 for autonomously valet parking a vehicle in a particular parking space using the autonomous valet parking system of the present disclosure. In various embodiments, the process 800 is represented by a set of instructions stored in one or more memories and executed by one or more processors (such as those described below in connection with FIG. 7). Although the process 800 is described with reference to the flowchart shown in FIG. 6, many other processes of performing the acts associated with this illustrated process 800 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the autonomous valet parking system receives an auto-valet park input, as indicated by block 802. The autonomous valet parking system determines the vehicle's location in any suitable manner, such as via a global positioning system (GPS) or via comparing identified objects in obtained images to a map of the parking area in which the designated parking space is located. The vehicle controller controls the vehicle to navigate to the location of a designated parking space, as indicated by block 806. The location of the designated parking space may be stored in a memory of the autonomous valet parking system or otherwise accessible by the automated valet parking system. After arriving, the autonomous valet parking system analyzes obtained images of the particular parking space to determine whether the particular parking space is available, as indicated by diamond 808. If the autonomous valet parking system determines that the particular parking space is available, the vehicle controller controls the vehicle to park in the particular parking space, as indicated by block 810. On the other hand, if the autonomous valet parking system determines at diamond 806 that the particular parking space is not available (e.g., another vehicle is parked there or a garbage can is in the way), the autonomous valet parking system generates and sends an error message to the driver, such as to the driver's cell phone.

5. Variations

In certain embodiments, the plenoptic cameras operate in the infrared spectrum, while in other embodiments the plenoptic cameras operate in the visible light spectrum. In various embodiments, the plenoptic cameras include a light source to provide enough light to enable the plenoptic cameras to obtain usable images (when ambient light is unacceptably low).

In certain embodiments, the vehicle controller is configured to determine the vehicle's location using either GPS or by comparing objects in obtained images to a map of a parking area. In one such embodiment, the vehicle controller by default uses GPS to determine the vehicle's location and switches to the object-comparison method when GPS is unavailable (e.g., when the vehicle is located in an underground parking garage).

In certain embodiments, a parking area host assigns a vehicle a parking space when the vehicle arrives at the parking area. In this embodiment, the autonomous valet parking system is configured to navigate the vehicle to and park in the assigned parking space using a process similar to that described above with respect to FIG. 6. For instance, in one example embodiment, when a vehicle arrives at a parking area, the autonomous valet parking system establishes communication with a server hosted by the parking area and receives, from the server, an assigned parking space. In another example embodiment, when a vehicle arrives at a parking area, the driver receives a ticket including an assigned parking space. In this embodiment, the autonomous valet parking system receives an indication of that assigned parking space from the driver, such as via a touch screen.

In various embodiments, the autonomous valet parking system is configured to create maps of parking areas in real-time using simultaneous location and mapping. Specifically, as the vehicle is navigating through a parking area and analyzing the obtained images for available parking spaces, the autonomous valet parking system is also mapping the parking area by noting the locations of various objects, such as curbs, buildings, street signs, street markings, and the like. This enables the autonomous valet parking system to determine the location of the vehicle and the location of available parking spaces more quickly the next time the vehicle visits that parking area.

In certain embodiments, the autonomous valet parking system is configured to report (such as through vehicle-to-vehicle communication or vehicle-to-server communication) parking space availability (e.g., where parking spaces are located and whether those parking spaces are available) to facilitate other vehicles finding a parking space. In certain embodiments, receipt of parking space availability information may depend on receipt of a fee from a drive. That is, in these embodiments, the driver must pay to receive parking space availability information.

In certain embodiments, the autonomous valet parking system enables the driver to input one or more parking space preferences and uses those parking space preferences to at least in part determine the parking space in which to park the vehicle. For instance, the autonomous valet parking system may receive preferences for: a parking space in the shade, a parking space that does not include a puddle, and a parking space that is not next to a large truck. The autonomous valet parking system uses sensor feedback to identify a parking space that satisfies these conditions.

Various embodiments of the autonomous valet parking system include or use one or more other sensors and/or cameras in addition to plenoptic cameras to determine the occupancy map, navigate the vehicle, and/or identify available parking spaces.

The plenoptic cameras may be any suitable plenoptic cameras, such as those available from Pelican Imaging.

6. Autonomous Valet Parking System Components

Figure 7:
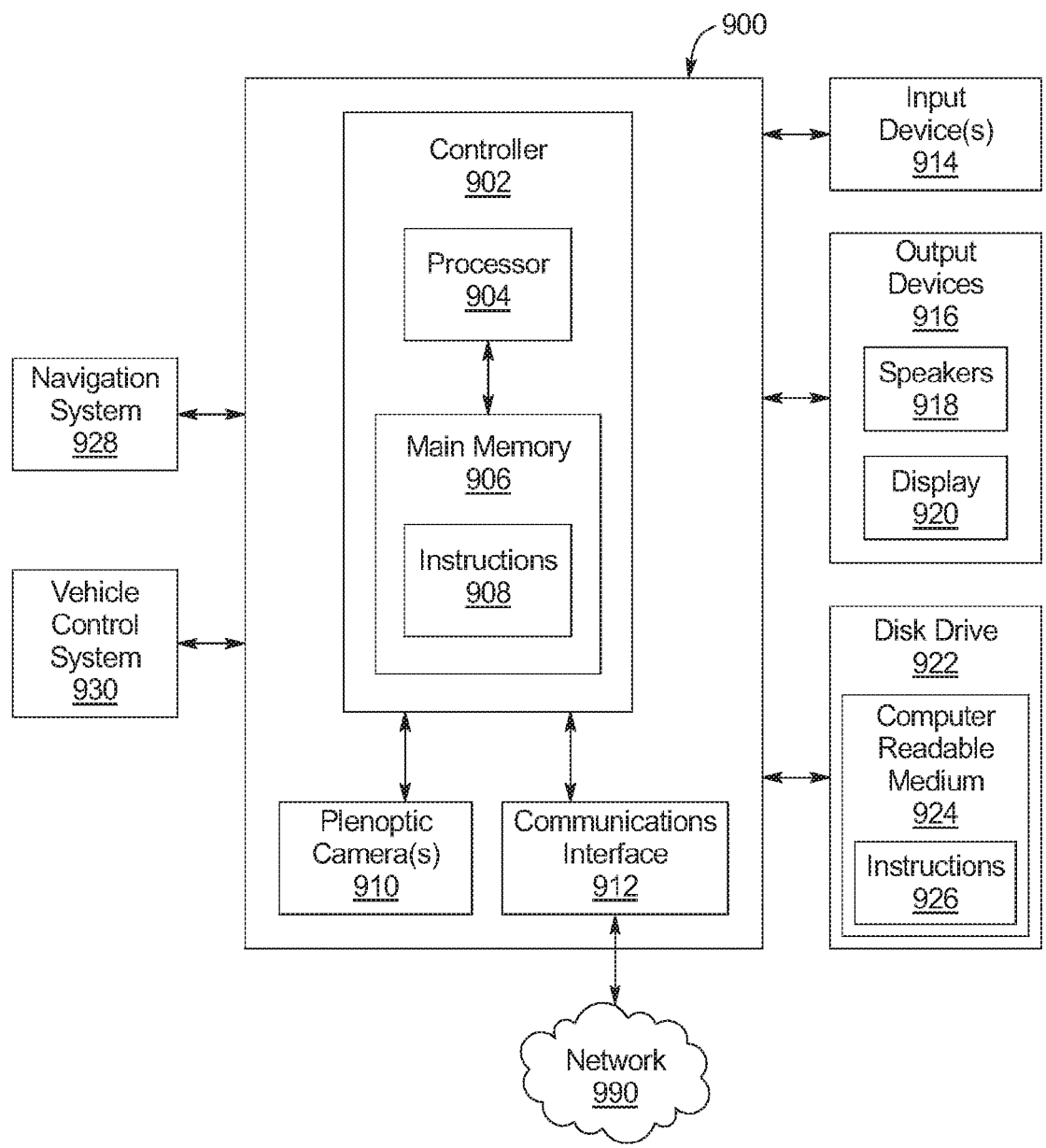
FIG. 7 illustrates a block diagram including components of one embodiment of the autonomous valet parking system of the present disclosure.

FIG. 7 illustrates one example embodiment of the autonomous valet parking system 900. Other embodiments of the autonomous valet parking system may include different, fewer, or additional components than those described below and shown in FIG. 7.

The autonomous valet parking system 900 includes a controller 902 comprised of at least one processor 904 in communication with a main memory 906 that stores a set of instructions 908. The processor 904 is configured to communicate with the main memory 906, access the set of instructions 908, and execute the set of instructions 908 to cause the autonomous valet parking system 900 to perform any of the methods, processes, and features described herein.

The processor 904 may be any suitable processing device or set of processing devices such as, but not limited to: a microprocessor, a microcontroller-based platform, a suitable integrated circuit, or one or more application-specific integrated circuits (ASICs) configured to execute the set of instructions 908. The main memory 906 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and/or read-only memory.

The autonomous valet parking system 900 includes one or more plenoptic cameras 910 (described above) in communication with the controller 902.

The autonomous valet parking system 900 includes a communications interface 912. The communications interface 912 is comprised of a wired and/or wireless network interface to enable communication with an external network 990. The external network 990 may be a collection of one or more networks, including standards-based networks (e.g., 2G, 3G, 4G, Universal Mobile Telecommunications Autonomous valet parking system (UMTS), GSM (R) Association, Long Term Evolution (LTE) (TM), or more); WiMAX; Bluetooth; near field communication (NFC); WiFi (including 802.11 a/b/g/n/ac or others); WiGig; Global Positioning Autonomous valet parking system (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols.

In some embodiments, the set of instructions 908 stored on the main memory 906 and that are executable to enable the functionality of the autonomous valet parking system 900 may be downloaded from an off-site server via the external network 990. Further, in some embodiments, the autonomous valet parking system 900 may communicate with a central command server via the external network 990. For example, the autonomous valet parking system 900 may communicate image information obtained by the plenoptic camera(s) 910 of autonomous valet parking system 900 to the central command server by controlling the communications interface 912 to transmit the images to the central command server via the external network 990. The autonomous valet parking system 900 may also communicate any generated data maps to the central command server.

The autonomous valet parking system 900 is configured to communicate with a plurality of vehicle components and vehicle systems (such as via one or more communications buses (not shown)) including: one or more input devices 914; one or more output devices 916; a disk drive 922; a navigation autonomous valet parking system 928 including a GPS receiver and configured to interface with a GPS to provide location-based information and directions (as known in the art); and a vehicle control system 930 usable to control operation of the vehicle, such as via controlling the accelerator, the brakes, etc.

The input devices 914 may include any suitable input devices that enable a driver or a passenger of the vehicle to input modifications or updates to information referenced by the autonomous valet parking system 900 as described herein. The input devices 914 may include, for instance, a control knob, an instrument panel, a keyboard, a scanner, a digital camera for image capture and/or visual command recognition, a touch screen, an audio input device (e.g., cabin microphone), buttons, a mouse, or a touchpad.

The output devices 916 may include instrument cluster outputs (e.g., dials, lighting devices), actuators, a display 920 (e.g., a liquid crystal display ("LCD"), an organic light emitting diode ("OLED"), a flat panel display, a solid state display, a cathode ray tube ("CRT"), or a heads-up display), and speakers 918.

The disk drive 922 is configured to receive a computer readable medium 924. In certain embodiments, the disk drive 922 receives the computer-readable medium 924 on which one or more sets of instructions 926, such as the software for operating the autonomous valet parking system 900, can be embedded. Further, the instructions 926 may embody one or more of the methods or logic as described herein. In a particular embodiment, the instructions 926 may reside completely, or at least partially, within any one or more of the main memory 906, the computer readable medium 924, and/or within the processor 904 during execution of the instructions by the processor 904.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer autonomous valet parking system to perform any one or more of the methods or operations disclosed herein.

Any process descriptions or blocks in the figures, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a plenoptic camera to obtain an image external to the vehicle;
a controller to:
autonomously navigate a vehicle toward a parking space identified as unoccupied;
generate, based on the image, an occupancy map indicating occupied regions in a plurality of concentric regions;
determine whether the parking space is available based on the occupancy map; and
send, in response to determining the parking space is unavailable, an error message to a driver.

2. The vehicle of claim 1, wherein the controller is configured to autonomously navigate the vehicle into the parking space in response to determining the parking space is available.

3. The vehicle of claim 1, wherein the plenoptic camera generates a depth map based on the image and the controller generates the occupancy map based on the depth map.

4. The vehicle of claim 1, wherein, to autonomously navigate the vehicle toward the parking space, the controller is configured to determine a location of the vehicle and determine a location of the parking space identified as being unoccupied.

5. The vehicle of claim 4, wherein the controller receives the location of the vehicle via a global positioning system.

6. The vehicle of claim 4, the location of the parking space determined by the controller is stored in memory.

7. The vehicle of claim 4, wherein, to determine the location of the parking space, the controller is configured to analyze the occupancy map to determine if the occupancy map includes an unoccupied region indicative of an available parking space.

8. The vehicle of claim 4, wherein the controller navigates the vehicle toward the parking space based on the occupancy map, the location of the vehicle, and the location of the parking space.

9. The vehicle of claim 1, wherein the controller determines that the parking space is unavailable when at least one of another vehicle and a garbage can is positioned within the parking space.

10. The vehicle of claim 1, wherein the controller sends the error message to the driver via a cell phone.

11. A method for autonomously parking vehicles, the method comprising:
obtaining an image via a plenoptic camera of a vehicle;
autonomously navigating, via a controller, the vehicle toward a parking space identified as unoccupied;
generating, based on the image, an occupancy map indicating occupied regions in a plurality of concentric regions;
determining whether the parking space is available based on the occupancy map; and
sending an error message in response to determining the parking space is unavailable.

12. The method of claim 11, further including autonomously navigating the vehicle into the parking space in response to determining the parking space is available.

13. The method of claim 11, further including generating, via the plenoptic camera, a depth map based on the image and generating, via the controller, the occupancy map based on the depth map.

14. The method of claim 11, further including determining a location of the vehicle and a location of the parking space to autonomously navigate the vehicle toward the parking space.

15. The method of claim 14, further including receiving the location of the vehicle via a global positioning system.

16. The method of claim 14, further including retrieving the location of the parking space from a memory.

17. The method of claim 14, furthering including analyzing the occupancy map to determine if the occupancy map includes an unoccupied region indicative of an available parking space to determine the location of the parking space.

18. The method of claim 14, wherein navigating the vehicle toward the parking space is based on the occupancy map, the location of the vehicle, and the location of the parking space.

19. The method of claim 11, wherein determining whether the parking space is unavailable includes identifying when at least one of another vehicle and a garbage can is positioned within the parking space.

20. The vehicle of claim 11, wherein sending the error message includes sending the error message to a driver via a cell phone.

* * * * *